United States Patent [19]

Koyama

[11] Patent Number: 4,758,470

[45] Date of Patent: Jul. 19, 1988

[54] STEERING WHEEL

[75] Inventor: Toru Koyama, Aichi, Japan

[73] Assignee: Toyoda Gosei Co., Ltd., Nishikasugai, Japan

[21] Appl. No.: 81,334

[22] Filed: Aug. 4, 1987

[30] Foreign Application Priority Data

Aug. 9, 1986 [JP] Japan ................................ 61-187571

[51] Int. Cl.$^4$ ........................ B62D 1/06; B32B 27/00; B32B 21/02
[52] U.S. Cl. ...................................... 428/327; 74/552; 74/558
[58] Field of Search .................... 74/552, 558; 428/65, 428/66, 424.6, 424.7, 327

[56] References Cited

U.S. PATENT DOCUMENTS 3,802,291 4/1974 Young, Jr. et al. ................... 74/552
4,579,775 4/1986 Ohta et al. .............................. 74/558
4,640,150 2/1987 Kobayashi et al. .................... 74/552

*Primary Examiner*—William J. Van Balen
*Attorney, Agent, or Firm*—Cushman, Darby & Cushman

[57] ABSTRACT

A steering wheel is described, which comprises a core that is covered with a synthetic resin covering material, wherein said covering material is coated with a urethane-based paint that contains 2 to 10 wt % of nylon beads having an average particle size of 10 to 30 μm.

4 Claims, 2 Drawing Sheets

STEERING WHEEL

FIELD OF THE INVENTION

The present invention relates to a steering wheel that is intended to be chiefly used as an automotive part.

BACKGROUND OF THE INVENTION

Conventional steering wheels employ covering materials that are made of soft vinyl chloride resins with a Shore hardness A (American Society for Testing and Materials (ASTM) D2240 Type A) of not more than 70 degrees. Such steering wheels, however, have low wear resistance, and whereby their embossed surface has a tendency to wear out during prolonged use. In order to avoid this problem, it has been proposed that the covering material made of a soft vinyl chloride resin be coated with a urethane-based paint. For instance, the applicant of the present invention previously proposed a steering wheel having a synthetic resin portion that was made of an injection-molded synthetic resin foam having a defined constant foaming ratio and which was surface-coated with a coating film as described in U.S. Pat. No. 4,640,150. In this steering wheel, the covering material of the resin portion which is made of an injection-molded soft vinyl chloride resin foam is coated with a urethane-based coating film so as to impart improved elasticity and wear resistance for the steering wheel. In addition, this construction lightens harsh conditions for molding the steering wheel.

However, the above-described conventional steering wheel having a urethane-based coating film coated on the surface of a soft vinyl chloride resin has the disadvantage that when it is used for a prolonged period, the embossed surface disappears and its wear resistance becomes insufficient. A further problem for this steering wheel is that its surface comes to have a wet touch as a result of prolonged use.

SUMMARY OF THE INVENTION

A object of the present invention is to obtain a steering wheel having an excellent wear resistance, without disappearance of an embossed surface, and having a dry touch during the prolonged use.

The object of the present invention can be attained by a steering wheel which comprises a core that is covered with a synthetic resin covering material, wherein said covering material is coated with a urethane-based paint that contains 2 to 10 wt % of nylon beads having an average particle size of 10 to 30 μm.

DETAILED DESCRIPTION OF THE INVENTION

Figure 1:
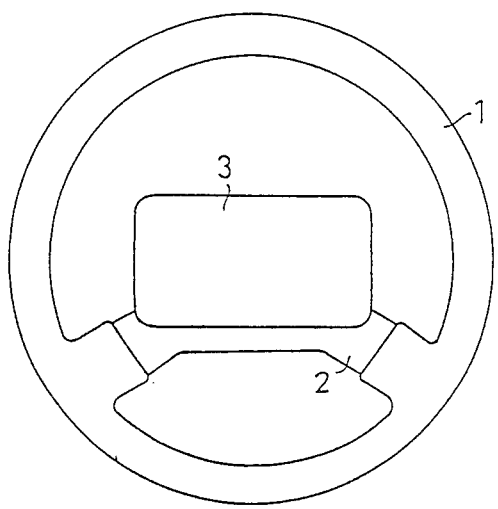
FIG. 1 is a front elevation view of the steering wheel of the present invention.

An embodiment of the present invention is hereinafter described with reference to FIGS. 1 to 3. The steering wheel of the present invention is shown schematically in FIG. 1 and consists of a ring portion 1, spokes 2 for supporting the ring portion 1, and a pad 3 that is positioned in the center of the ring portion 1 to fix the spokes 2 and further to fix an equipment for a horn.

Figure 2:
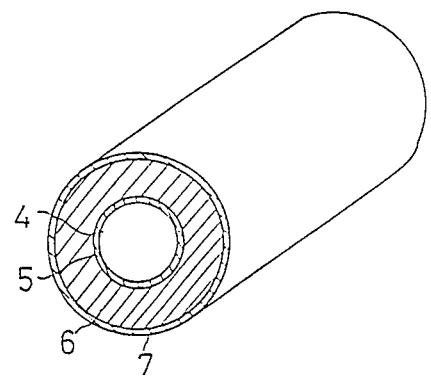
FIG. 2 is a partial cutaway perspective view of the ring portion of the steering wheel shown in FIG. 1.

A cross-sectional view of the ring portion 1 is shown in FIG. 2; it basically consists of a core 4 comprising a core material such as metals and a soft vinyl chloride resin covering material 6 that is intimately bonded to the core 4 by an adhesive layer 5 and is formed by injection molding. In the present invention, the covering material on the core 4 may be made of any synthetic resin other than PVC such as a surface-treated olefinic resin or urethane-based resin. Further the covering material may be a foamed or non-foamed resin, but preferably is a non-foamed resin.

The covering material is advantageously made by injection molding a resin composition that consists of 100 parts by weight of a synthetic resin, particularly a soft vinyl chloride resin, 100 to 200 parts by weight and preferably 120 to 170 parts by weight, of a phthalic acid ester based plasticizer reprsented the formula (I) shown below and 10 to 40 parts by weight and preferably 20 to 30 parts by weight, of an acrylonitrile-butadiene rubber:

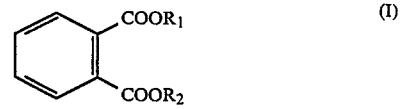

where $R_1$ and $R_2$ are each an alkyl group, provided that when the total number of moles of $R_1$ and $R_2$ is 100, a monomethyloctyl group is present in an amount of 10 to 60 moles while a dimethylheptyl group is present in an amount of 30 to 70 moles.

The above described covering material is flexible and, because of the combination of the specific plasticizer and an acrylonitrile-butadiene rubber, it is substantially free from the "bleeding" of the plasticizer which will cause adverse effects on the coating film that is to be formed on the covering material. A thickness of the covering material is preferably from 3 to 20 mm.

Turning back to FIG. 2, the coating film 7 is formed on the surface of the soft vinyl chloride resin covering material 6. The coating film 7 is provided by applying a urethane-based paint that contains 2 to 10 wt % of spherical nylon beads having an average particle size of 10 to 30 μm. A thickness of the coating film typically ranges from 10 to 50 μm.

That is, the urethane-based paint used in the present invention has uniformly dispersed therein 2 to 10 wt % of nylon beads having an average particle size of 10 to 30 μm, and can be uniformly coated on the surface of the steering wheel of a soft vinyl chloride resin without impairing its adhesion to the coating film.

If the average particle size of the nylon beads is less than 10 μm, the surface of the resulting steeling wheel is sticky and fails to provide a good touch to the hands of the driver. If the average particle size of the nylon beads is more than 30 μm, the resulting coating film does not have sufficiently good elongation to withstand bending. In addition, the coating film has a rough surface and fails to provide a soft touch to the hands of the driver.

If the content of nylon beads in the coating film is less than 2 wt %, the resulting coating film does not have sufficient wear resistance to retain the embossed surface of the synthetic resin covering material. If the content of nylon beads in the coating film is more than 10 wt %, elongation of the coating film is decreased, and whereby the durability of the coating film is decreased.

If the thickness of the coating film is less than 10 μm, it does not have sufficient wear resistance. Even if the thickness of the coating film exceeds 50 μm, no further improvement in wear resistance is attained and lack of economy will be the simple result.

The urethane-based paint used in the present invention may be any of conventional type that is commonly employed in the art. Urethane-based paints are generally the reaction product of aliphatic or aromatic polyisocynate compounds such as 4,4'-diphenylmethanediisocyanate, 4,4'-diphenyletherdiisocyanate, 1,5-naphthalenediisocyanate, etc., and polyol compounds such as polyetherpolyol, polycarbonatepolyol, polymerpolyol, and polyesterpolyol (e.g., polyoxypropylene glycol, polyoxyethylene glycol, polyethylene adipate glycol, polybutylene adipate glycol, etc.,) and high wear resistance and elasticity can be produced from any of the known types of urethane-based paints.

Figure 3:
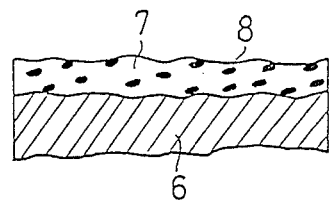
FIG. 3 is an enlarged cross-sectional view of the coating film formed on the synthetic resin covering material of the ring portion.

The details of the coating film 7 are shown schematically in FIG. 3. Nylon beads 8 are uniformly dispersed in the coating film 7 formed on the surface of the soft vinyl chloride resin covering material 6.

The nylon beads used in the present invention are generally in a spherical form and are made of any kind of nylon such as nylon 6,6, nylon 6, nylon 6,10, nylon 11 or nylon 12.

Nylon is straight-chain high-molecular weight compounds having amide bonds and can be produced by either polycondensation or ring opening polymerization. Nylons have excellent impact resistance and do not dissolve in common organic solvents. Their degree of crystallization varies with the method of forming, the conditions used in forming, or the method of heat treatment applied, but they have such a high wear resistance that they are suitable for use as the materials of machine parts. In addition, unlike fluoropolymers, nylons have high affinity for adhesives and can be used without impairing the performance of the coating film that is formed by application of the urethane-based paint.

The urethane-based paint used in the present invention may be applied by any known coating method such as a brush coating method, a dip coating method or a spray coating method.

EXAMPLE

The effect of combining the essential features of the present invention as described above is hereunder demonstrated by experimental data.

EXAMPLE 1

As shown in Table 1, Sample and Comparative Samples were prepared, and then were evaluated by a wear resistance test. Sample 1 was prepared according to the present invention and the others being comparative samples.

Figure 4:
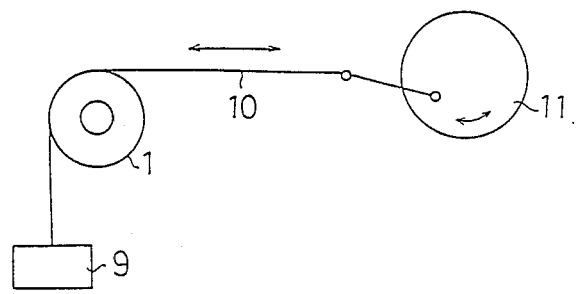
FIG. 4 is a sketch of equipment used in a wear resistance test on a steering wheel.

First, a wear resistance test of steering wheels is explained below. The test equipment is shown in FIG. 4; a sheet of cotton duck (woven fabric of cotton)No. 10 stretched by a weight 9 as abrasive cloth is rubbed against the ring portion 1 of a steering wheel in opposite directions by rotating a crank 11.

Testing conditions

Cotton duck: No. 10 (according to JIS L3102)
Abrasion: 30 cycles/min at a stroke of 120 mm
Load: 100 g or 1 kg Criterion of evaluation Acceptable if no abnormal wear occurs after 50,000 cycles under 100 g, or 5,000 cycles under 1 Kg
G: Good (Acceptable)
P: Poor (Unacceptable)

Urethane-based paint

Main ingredient: acrylic polyester polyol
Hardening agent: quick drying and non-yellowing hexamethylene diisocyanate prepolymer
Main ingredient/hardening agent/thinner = 15/2/8 to 12 in weight ratio
The test results are shown in Table 1.

TABLE 1

| Sample No. | Component | Testing Condition | Results | Evaluation |
|---|---|---|---|---|
| Comparative Sample | | | | |
| 1 | soft vinyl chloride resin alone (Shore hardness A: 40 deg.) | RT and 5,000 cycles under 1 Kg | embossed surface lost | P |
| 2 | soft vinyl chloride resin alone (Shore hardness A: 50 deg.) | RT and 5,000 cycles under 1 kg | embossed surface lost | P |
| 3 | soft vinyl chloride resin alone (Shore hardness A: 70 deg.) | RT and 5,000 cycles under 1 kg | wore slightly | P |
| 4 | soft vinyl chloride resin alone (Shore hardness A: 70 deg.) | 70° C. and 5,000 cycles under 1 kg | embossed surface lost | P |
| 5 | soft vinyl chloride resin (Shore hardness A: 40 deg.) plus urethane-based paint containing no nylon beads (thickness of coating film: 10 μm) | RT and 5,000 cycles under 1 kg | embossed surface lost | P |
| 6 | soft vinyl chloride resin (Shore hardness A: 70 deg.) plus urethane-based paint containing no nylon beads (thickness of coating film: 10 μm) | 70° C. and 5,000 cycles under 1 kg | wore slightly | P |
| Sample (Invention) | | | | |
| 1 | soft vinyl chloride resin (Shore hardness A: 40 deg.) plus urethane-based paint containing 2 wt % nylon beads (thickness of coating film: 30 μm) | RT and 5,000 cycles under 1 kg | remained intact | G |

Remarks:
RT: Room temperature

As is apparent from the results of Table 1, the comparative samples which were obtained using either uncoated soft vinyl chloride resin (PVC) covering material or those coated with urethane-based paints containing no nylon beads had no satisfactory wear resistance. On the other hand, the sample prepared in accordance with the present invention which was obtained using a soft PVC covering material that was coated with a urethane-based paint containing nylon beads had satisfactors wear resistance.

EXAMPLE 2

Tests were also conducted to evaluate other properties of samples in which the soft PVC covering material was coated with four different paint compositions containing varied amounts of nylon beads as shown below. The coating film in each sample was thicker than that to be employed in practical applications.

| Paint | A | B | C | D | E |
|---|---|---|---|---|---|
| Content of nylon beads (an average particle size: 20 μm) (wt %) | 0 | 3 | 6 | 10 | 15 |
| Thickness of coating film (μm) | 105 | 120 | 115 | 105 | 110 |

The results are shown in Table 2 below.

TABLE 2

|  | Comparative Samples | | Samples | | |
|---|---|---|---|---|---|
|  | 7 | 8 | 2 | 3 | 4 |
| Paint | A | E | B | C | D |
| Tensile Strength (kgf/cm²) | 201 | 170 | 223 | 194 | 181 |
| Elongation (%) | 90 | 30 | 85 | 70 | 50 |
| Adhesive Strength | 0/100 | 5/100 | 0/100 | 0/100 | 2/100 |
| Bending at 180° | E | P | E | G | G |
| Touch to the hand | sticky | rough | good | good | rough |

Note:
Adhesive Strength
The test for adhesive strength was carried out according to JIS K5400. That is, 100 squares in a checkerboard pattern were cut through the coating film into the surface of the synthetic resin covering material and an adhesive tape was attached to the coating film. The tape was then peeled apart from the coating film in order to measure the adhesive strength between the coating film and the underly resin covering material. The results were indicated as a number of square peeled apart per 100 squares.

Bending at 180°

The test for bending at 180° were evaluated by the results which were obtained when the samples were bended at 180° by hand. The evaluation are shown below.
E: Crack and peeling apart were not observed on the coating film at all.
G: Crack and peeling apart were little observed on the coating film.
P: Crack and peeling apart were clearly observed.

As is apparent from the results of Table 2, the samples having a coating film made from a urethane-based paint containing nylon beads whose average particle size exceeded 30 μm or which were present in an amount exceeding 10 wt % had a rough surface that failed to provide a soft touch to the hand. The paint containing more than 10 wt % of nylon beads did not exhibit a good spread and a strong adhesion.

The action of mechanism by which the steering wheel of the present invention attains its intended object is hereunder described. The nylon beads having an average particle size of 10 to 30 μm which are used in the present invention are uniformly dispersed in a urethane-based paint which is to be coated on the surface of the ring portion made of a soft vinyl chloride resin. The resulting steering wheel of the present invention exhibits strong adhesion between the coating film 7 and the soft vinyl chloride resin covering material 6. Because of the nature of the urethane-based paint containing nylon beads, the embossed surface of the resin covering material will remain intact for a prolonged period of use and thereby imparts great durability to the steering wheel.

The coating film of urethane-based paint has the additional advantage that it will minimize the bleed-out of the plasticizer in the soft vinyl chloride resin covering material and thereby prevent the clouding of glass windows of an automobile.

In summary, the steering wheel of the present invention has the advantage that it exhibits such a high level of wear resistance during prolonged use and thereby its surface will remain in an embossed state while ensuring a dry touch to the hands of the driver.

While the invention has been described in detail and with reference to specific embodiments thereof, it will be apparent to one skilled in the art that various changes and modifications can be made therein without departing from the spirit and scope thereof.

What is claimed is:
1. A steering wheel which comprises a core that is covered with a synthetic resin covering material, wherein said covering material is coated with a urethane-based paint that contains 2 to 10 wt % of nylon beads having an average particle size of 10 to 30 μm.
2. A steering wheel as claimed in claim 1 wherein said synthetic resin covering material comprises a soft vinyl chloride resin.
3. A steering wheel as claimed in claim 2 wherein said soft vinyl chloride resin is composed of a vinyl chloride resin, a plasticizer and an acrylonitrile-butadiene rubber.
4. A steering wheel as claimed in claim 1, wherein said synthetic resin covering material is a non-foamed soft vinyl chloride resin.

* * * * *